(12) United States Patent
Yoshikawa et al.

(10) Patent No.: US 8,869,921 B2
(45) Date of Patent: Oct. 28, 2014

(54) CRAWLER WORK VEHICLE

(71) Applicant: Komatsu Ltd., Tokyo (JP)

(72) Inventors: Takeshi Yoshikawa, Hakusan (JP); Taneaki Fujino, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/995,545

(22) PCT Filed: Oct. 1, 2012

(86) PCT No.: PCT/JP2012/075294
§ 371 (c)(1),
(2), (4) Date: Jun. 19, 2013

(87) PCT Pub. No.: WO2013/164900
PCT Pub. Date: Nov. 7, 2013

(65) Prior Publication Data
US 2014/0196961 A1 Jul. 17, 2014

(30) Foreign Application Priority Data
May 1, 2012 (JP) ................................. 2012-104520

(51) Int. Cl.
*B62D 11/08* (2006.01)
*E02F 9/20* (2006.01)
*E02F 9/22* (2006.01)
*B62D 11/00* (2006.01)

(52) U.S. Cl.
CPC .............. *B62D 11/08* (2013.01); *E02F 9/2025* (2013.01); *E02F 9/225* (2013.01); *B62D 11/005* (2013.01)

USPC .......................................................... 180/6.7

(58) Field of Classification Search
USPC .................................... 180/6.2, 6.7, 9.1, 9.44
See application file for complete search history.

(56) References Cited

U.S. PATENT DOCUMENTS 5,588,515 A * 12/1996 Toyama et al. ............... 192/222
6,755,487 B2 * 6/2004 Suzuki et al. ................. 303/121

FOREIGN PATENT DOCUMENTS

| JP | 1-501054 A | 4/1989 |
| JP | 8-18573 A | 2/1996 |
| JP | 2000-168609 A | 6/2000 |
| JP | 2003-63439 A | 3/2003 |
| JP | 2010-144598 A | 7/2010 |
| JP | 2010-144816 A | 7/2010 |

* cited by examiner

*Primary Examiner* — Kevin Hurley
(74) *Attorney, Agent, or Firm* — Global IP Counselors, LLP

(57) ABSTRACT

An occurrence of steering clutch slippage is reliably determined in order to protect the steering clutch. A crawler work vehicle includes left and right steering clutches, left and right steering brakes, a rotation speed detecting difference device, a clutch hydraulic pressure obtaining device, and a clutch protecting device. The rotation speed difference detecting device detects a rotation speed difference between the input and output of each of the steering clutches. The clutch hydraulic pressure obtaining device obtains a clutch hydraulic pressure supplied to each steering clutch. The clutch protecting device refers to the rotation speed difference and the clutch hydraulic pressure, computes a steering clutch heat rate, and compares the computed heat rate with a preset first threshold to execute a steering clutch protection process.

13 Claims, 5 Drawing Sheets

CRAWLER WORK VEHICLE

CROSS-REFERENCE TO RELATED APPLICATIONS

This application is a U.S. National stage application of International Application No. PCT/JP2012/075294, filed Oct. 1, 2012.

BACKGROUND

1. Field of the Invention

The present invention relates to a work vehicle and, in particular, to a crawler work vehicle that travels using a crawler and is steered using steering clutches and steering brakes.

2. Background Information

In a bulldozer which is an example of a crawler work vehicle, power from an engine is transmitted through a transmission to left and right drive wheels so that the left and right crawlers are driven. This type of bulldozer is provided with steering clutches and steering brakes corresponding to the left and right drive wheels. Left and right turning is conducted by controlling the left and right steering clutches and steering brakes with hydraulic pressure (see for example Japanese Patent Publication No. H8-18573).

For example, when turning left, the left side steering brake is engaged (brake on=braking condition) and the left side steering clutch is disengaged (clutch off=power blocked condition), while the right side steering clutch is engaged and the right side steering brake is disengaged.

The clutches and brakes are controlled as described above so that power from the engine is transmitted through the right steering clutch to the right side crawler and the vehicle turns left.

SUMMARY

In a bulldozer having the aforementioned steering clutches and steering brakes, slippage occurs in the steering clutches under the following conditions.

(Condition 1)

For example, when turning left, the steering clutch is on and the steering brake is off in the right side transmission system as described above. In such a condition, that is, during the left turn, the left and right steering brakes are both on when the operator operates the foot brake. As a result, while power is being transmitted to the steering clutch in the right side transmission system, braking of the rotation of that steering clutch is conducted with the steering brake and thus conflicting operations are executed.

The output of the engine in such a condition is absorbed by a torque converter and an overload acting on the steering clutch is suppressed. Therefore, slippage of the steering clutch is prevented. However, when the torque is especially large such as in a forward 1 speed, the engine output cannot be absorbed by the torque converter and slippage occurs in the right steering clutch.

(Condition 2)

The bulldozer may be performing boulder lifting work as described below.

In the initial stage of boulder lifting work, the boulder below the crawler is pulled by the left edge of the blade. The vehicle drives forward with the blade in the same location. Then a load is applied to the back of the left crawler so that the front of the vehicle lifts upward. Since the ground contact area of the crawler is different in the front and back and the average ground contact pressure drops when the front of the vehicle lifts upward, the left crawler slips.

The steering clutch does not slip when the crawler slips as described above.

However, under the above conditions, the operator raises the blade to prevent the crawler from slipping. As a result, the entire surface of the left crawler contacts the ground and consequently an overload acts on the left side steering clutch. While the steering clutch does not slip if the overload can be absorbed by the torque converter as described above, slippage does occur in the steering clutch if the overload is not absorbed by the torque converter.

As described above, slippage may occur in the steering clutch due to the traveling condition or due to the type of work. The clutch may become scorched and damaged if the slippage continues for a long period of time in this way. Accordingly in the conventional vehicle, various cases (such as the abovementioned condition 1 and condition 2) of steering clutch slippage occurrences are predicted and the steering clutches are protected by reducing the engine output and the like when such a traveling condition or work type condition is met.

However, it is difficult to predict all the conditions of steering clutch slippage and set requirements accordingly, and thus the steering clutches may not be sufficiently protected. Furthermore, the operator may feel uneasy when the engine output is quickly reduced when slippage of the steering clutch occurs so that smooth operations cannot be achieved.

An object of the present invention is to reliably determine the occurrence of steering clutch slippage and protect the steering clutch.

Another object of the present invention is to execute a steering clutch protection process and reduce the feeling of unease of the operator.

A crawler work vehicle according to a first aspect of the present invention includes an engine, left and right travel devices, a power transmission device, left and right steering clutches, left and right steering brakes, a rotation speed difference detecting means, a clutch hydraulic pressure obtaining means, and a clutch protecting means. The left and right travel devices each have a crawler and a drive wheel for driving the crawler. The power transmission device transmits power from the engine to the drive wheels of the left and right travel devices. The left and right steering clutches are disposed between the power transmission device and the left and right drive wheels and transmit or block power. The left and right steering brakes are respectively disposed between the left and right steering clutches and the left and right drive wheels and brake rotation of the left and right drive wheels. The rotation speed difference detecting means detects a rotation speed difference between the input and output of each of the steering clutches. The clutch hydraulic pressure obtaining means obtains a clutch hydraulic pressure supplied to the steering clutches. The clutch protecting means refers to the rotation speed difference and the clutch hydraulic pressure, computes a steering clutch heat rate, and compares the computed heat rate with a preset first threshold to execute a steering clutch protection process.

The power from the engine is transmitted through the power transmission device and the left and right steering clutches to the left and right travel devices. When turning, one of the steering clutches is engaged and one of the steering brakes is disengaged, and the other steering clutch is disengaged and the other steering brake is engaged. As a result, the vehicle turns in one direction.

When the foot brake is operated for example under the above conditions, the steering brake on the side in which the steering clutch is engaged is also engaged. As a result, slippage in the steering clutch may occur.

Accordingly, a difference in the input and output rotation speeds of the steering clutches and the clutch hydraulic pressure is referenced to compute a steering clutch heat rate, and the computing result is compared to a preset first threshold. The steering clutch protection process is executed in accordance with the comparison result.

A steering clutch in which slippage occurs can be reliably protected with high accuracy since the heat rate of the steering clutch in which slippage occurs is computed and the protection process is executed on the basis of the computing result.

The crawler work vehicle according to a second aspect of the present invention relates to the work vehicle of the first aspect, wherein the clutch protecting means reduces the engine output when the heat rate is equal to or greater than the first threshold.

The steering clutch can be reliably protected since the engine output is reduced when the steering clutch heat rate is equal to or greater than the first threshold. Further, since the output of the engine is controlled in consideration of the heat rate of the steering clutch itself, defects such as unnecessarily reducing the engine output or not reducing the engine output when necessary can be prevented. Specifically, protection control with high accuracy can be achieved.

A crawler work vehicle according to a third aspect of the present invention is related to the work vehicle of the second aspect and further includes an engine speed determining means that determines whether the engine speed is a preset accepted minimum rotation speed. Further, when the heat rate is equal to or greater than the first threshold, the clutch protecting means executes a warning process without reducing the engine output when the engine rotation speed is lower than a minimum rotation speed.

Reducing the output by lowering the engine rotation speed and the like when the heat rate of a steering clutch meets or exceeds the first threshold is an effective process for protecting the steering clutches. However, if the engine speed is reduced too much, satisfactory vehicle performance cannot be achieved. Accordingly, if the engine speed falls below the minimum speed accepted for vehicle performance, a process to issue a warning to the operator is executed instead of reducing the engine output.

The crawler work vehicle according to a fourth aspect of the present invention relates to the work vehicle of the second and third aspects, wherein the clutch protecting means increases the engine output by a certain amount when the heat rate is equal to or less than a second threshold that is smaller than the first threshold.

If the steering clutch heat rate falls, there is no need to reduce the engine output, and the engine output is preferably increased in consideration of turning performance, work efficiency, and the like.

Accordingly, in a vehicle according to the fourth aspect, the engine output is increased by a certain amount when the heat rate falls below the second threshold. As a result, the reduction of the engine output is reduced to the minimum required for protecting the steering clutch and the feeling of unease in the operator when the protection process is executed is suppressed. The second threshold is a value that is smaller than the value of the first threshold, and hysteresis is maintained by the thresholds so that chattering during the control is prevented.

The crawler work vehicle according to a fifth aspect of the present invention relates to the work vehicle of the first aspect, wherein the clutch protecting means disengages the steering clutch with a heat rate amount equal to or greater than the first threshold when the heat rate amount is equal to or greater than the first threshold.

Since the steering clutch in which the heat rate increases is disengaged, the load on the clutch decreases which allows for reliable protection.

The crawler work vehicle according to a sixth aspect of the present invention relates to the work vehicle of the fifth aspect, wherein the clutch protecting means executes a warning process after disengaging the steering clutch when the heat rate amount is equal to or greater than the first threshold.

A response of the operator can be encouraged due to the execution of the warning process.

A crawler work vehicle according to a seventh aspect of the present invention is related to the work vehicle from any of the first to sixth aspects, wherein the power transmission device includes a torque converter that transmits power through operating fluid.

When an overload acts on the steering clutches, the protection of the steering clutches becomes easier since a certain load can be absorbed by the torque converter.

In the present invention as described above, the occurrence of steering clutch slippage is correctly determined and the steering clutch can be protected with high accuracy. Further, an operator's feeling of unease due to the heat rate of the steering clutch approaching a certain threshold can be suppressed and the steering clutch can be protected.

DETAILED DESCRIPTION OF EMBODIMENTS

Figure 1:
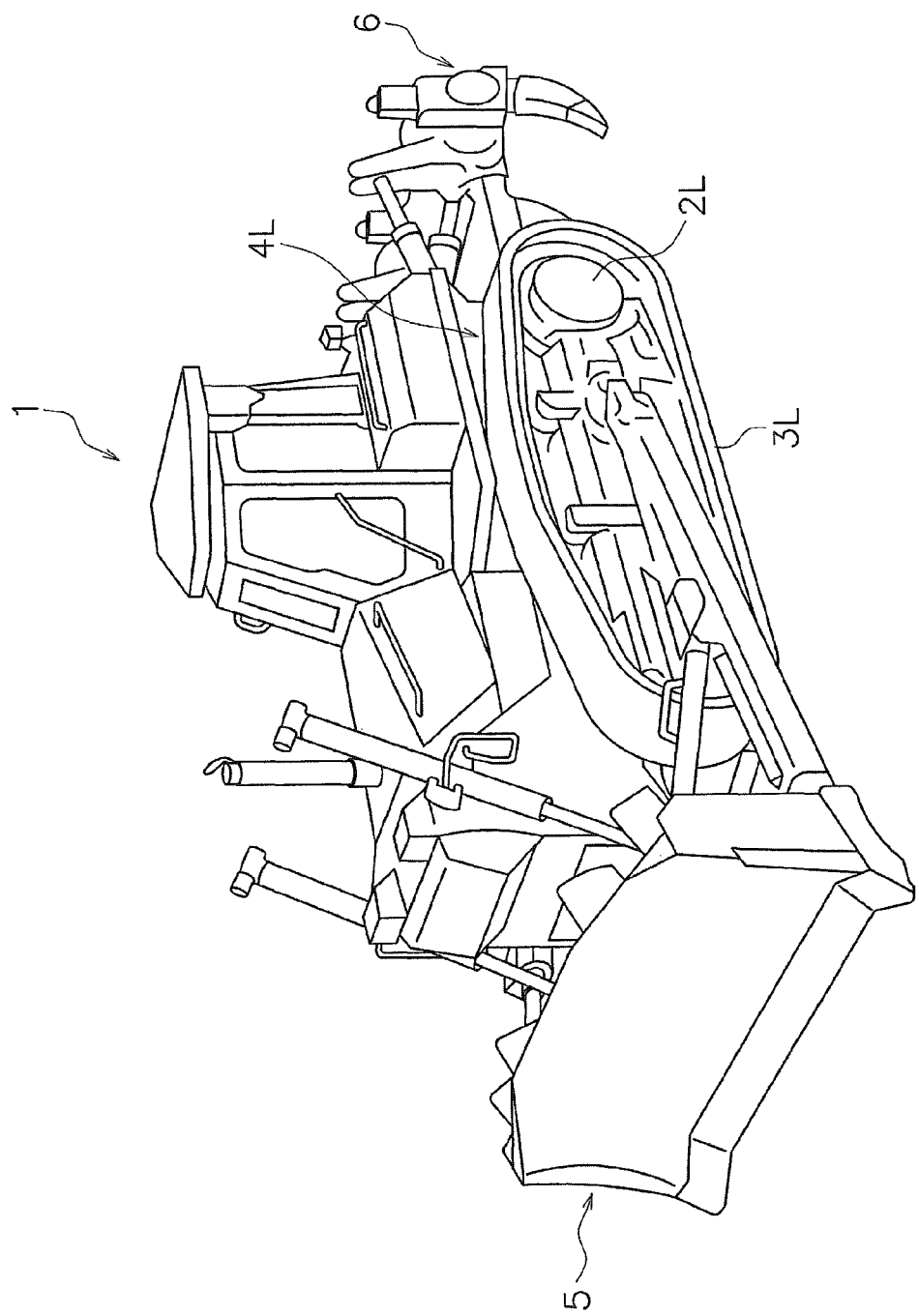
FIG. 1 is an external perspective view of a bulldozer according to an embodiment of the present invention.
Figure 2:
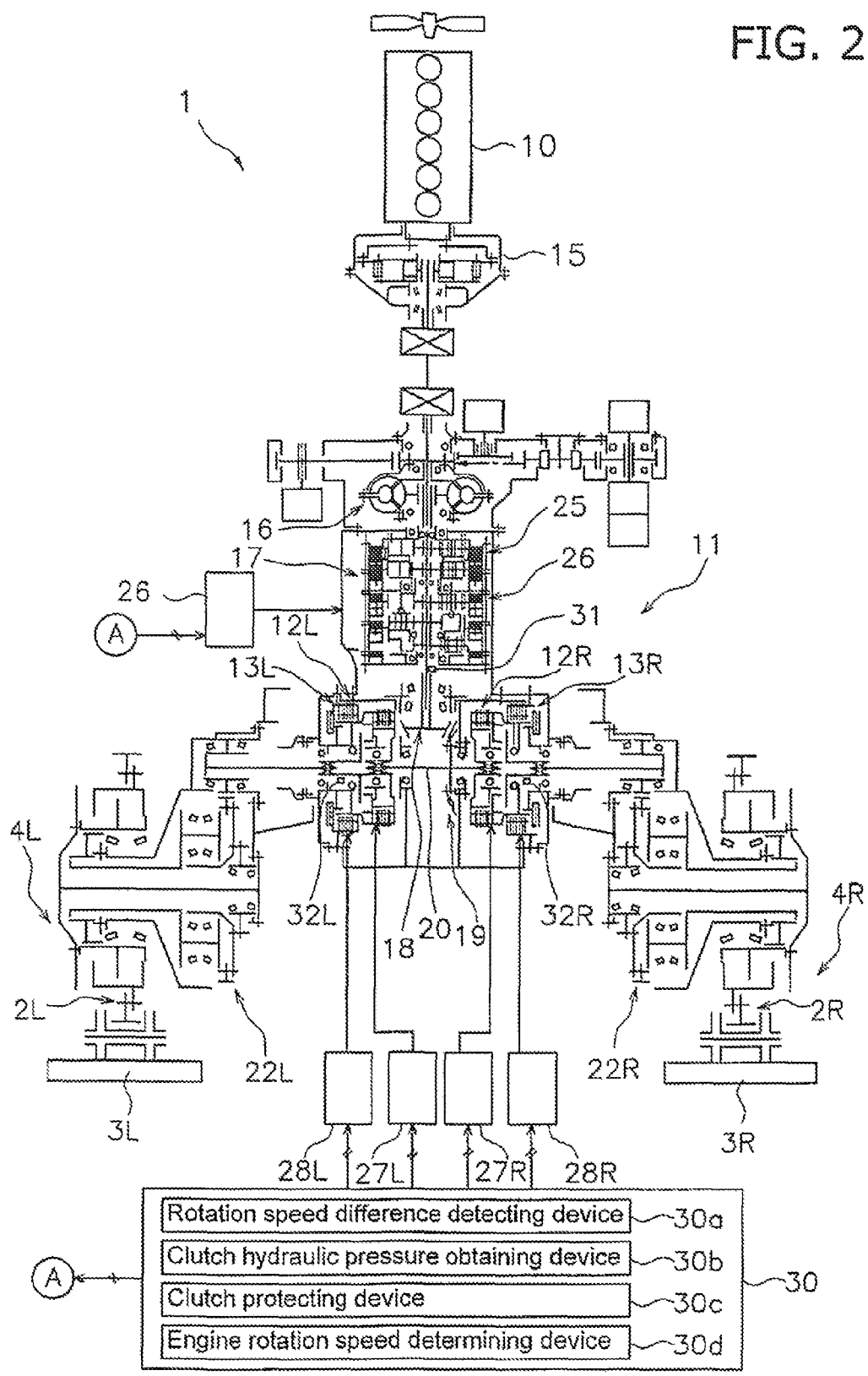
FIG. 2 illustrates a schematic configuration of the bulldozer illustrated in FIG. 1.

A bulldozer 1 illustrated in FIG. 1 is an example of a crawler work vehicle. The bulldozer 1 is equipped with left and right travel devices 4L, 4R that respectively have sprockets 2L, 2R and crawlers 3L, 3R, a blade 5 provided at the vehicle front portion, and a ripper device 6 provided at the vehicle back portion as illustrated in FIGS. 1 and 2. The bulldozer 1 is able to do work such as pushing earth with the blade 5, and work such as excavation and crushing and the like with the ripper device 6.

As illustrated in FIG. 2, the bulldozer 1 includes an engine 10, a power transmission device 11 that transmits power from the engine 10 to the left and right sprockets 2L, 2R, left and right steering clutches 12L, 12R, and left and right steering brakes 13L, 13R.

Power from the engine 10 is transmitted through a damper 15 to a torque converter 16 in the power transmission device 11. An output shaft of the torque converter 16 is coupled to an input shaft of a transmission 17 so that power from the torque converter 16 is transmitted to the transmission 17. The power output from the transmission 17 is transmitted through a first bevel gear 18 and a second bevel gear 19 to a cross shaft 20.

The power transmitted to the cross shaft 20 is transmitted through the left steering clutch 12L and a left final drive gear 22L to the left sprocket 2L. Moreover, the power transmitted to the cross shaft 20 is transmitted through the right steering clutch 12R and a right final drive gear 22R to the right sprocket 2R. The crawlers 3L, 3R are wound around the sprockets 2L, 2R. As a result, when the sprockets are rotated, the crawlers 3L, 3R are driven and consequently the bulldozer 1 travels.

A forward-reverse shifting clutch 25 and a plurality of gear changing clutches 26 are provided in the transmission 17. The clutches 25, 26 are hydraulic clutches that are able to switch hydraulically between an engaged condition and a disengaged condition. The supply and discharge of pressure oil to the clutches 25, 26 are controlled by a transmission control valve 26.

The left and right steering clutches 12L, 12R are respectively provided between the power transmission device 11 and the left and right sprockets 2L, 2R, and are hydraulic clutches that are able to hydraulically switch between an engaged condition and a disengaged condition. The supply and discharge of pressure oil to the steering clutches 12L, 12R is controlled by steering clutch control valves 27L, 27R. The left and right steering clutches 12L, 12R are negative type hydraulic clutches and thus are engaged when hydraulic pressure is not supplied and become disengaged when a certain amount or more hydraulic pressure is supplied.

Power is transmitted from the second bevel gear 19 to the left sprocket 2L when the left steering clutch 12L is in the engaged condition. Further, power is transmitted from the second bevel gear 19 to the right sprocket 2R when the right steering clutch 12R is in the engaged condition.

The left and right steering brakes 13L, 13R are respectively disposed between the left and right steering clutches 12L, 12R and the left and right sprockets 2L, 2R, and are hydraulic clutches that are able to hydraulically switch between an engaged condition and a disengaged condition. The supply and discharge of pressure oil to the steering brakes 13L, 13R is controlled by brake control valves 28L, 28R.

Braking of the output rotation of the left steering clutch 12L, that is, rotation of the left sprocket 2L, is possible in accordance with the braking condition of the left steering brake 13L. Further, braking of the output rotation of the right steering clutch 12R, that is, rotation of the right sprocket 2R, is possible in accordance with the braking condition of the right steering brake 13R.

According to the above configuration, when the left steering clutch 12L is disengaged and the left steering brake 13L is in the braking condition while the right steering clutch 12R is engaged and the right sprocket 2R is rotating, the bulldozer 1 turns to the left. Conversely, when the right steering clutch 12R is disengaged and the right steering brake 13R is in the braking condition while the left steering clutch 12L is engaged and the left sprocket 2L is rotating, the bulldozer 1 turns to the right.

(Configuration for Output Control)

The bulldozer 1 has a control unit 30. The control unit 30 switches velocity stages of the transmission 17, controls the control valves 26, 27L, 27R, 28L, 28R, and executes a protection process of the left and right steering clutches 12L, 12R.

To carry out protection of the left and right steering clutches 12L, 12R, the control unit 30 includes an on/off determining function, a rotation speed difference detecting function/device 30a, a steering clutch hydraulic pressure obtaining function/device 30b, and a protection function/device (or clutch protecting device) 30c, as shown in FIG. 2.

The on/off determining function is a function for determining whether each of the steering clutches 12L, 12R is in an engaged condition or a disengaged condition according to a hydraulic pressure command value for the steering clutches 12L, 12R. The rotation speed difference detecting function/device 30a is a function/device for detecting input/output rotation speed differences of each of the steering clutches 12L, 12R from a rotation speed detecting sensor 31 that detects the rotation speed of the output shaft of the transmission 17 and from rotation speed detecting sensors 32L, 32R respectively provided on output portions of the steering clutches 12L, 12R. The clutch hydraulic pressure obtaining function/device 30b is a function/device for obtaining a hydraulic pressure supplied to the steering clutches 12L, 12R according to the hydraulic pressure command value for the steering clutches 12L, 12R. The hydraulic pressure of the steering clutches 12L, 12R in this case is the hydraulic pressure when slippage occurs in the steering clutches 12L, 12R. The protection function/device 30c is function/device for referring to the rotation speed difference and the clutch hydraulic pressure, computing a heat rate of the steering clutch in which slippage occurs, and comparing the computed heat rate with a preset first threshold to execute a steering clutch protection process.

The hydraulic pressure supplied to the steering clutches 12L, 12R may be actually detected by a hydraulic pressure sensor.

(Protection Process)

Figure 3:
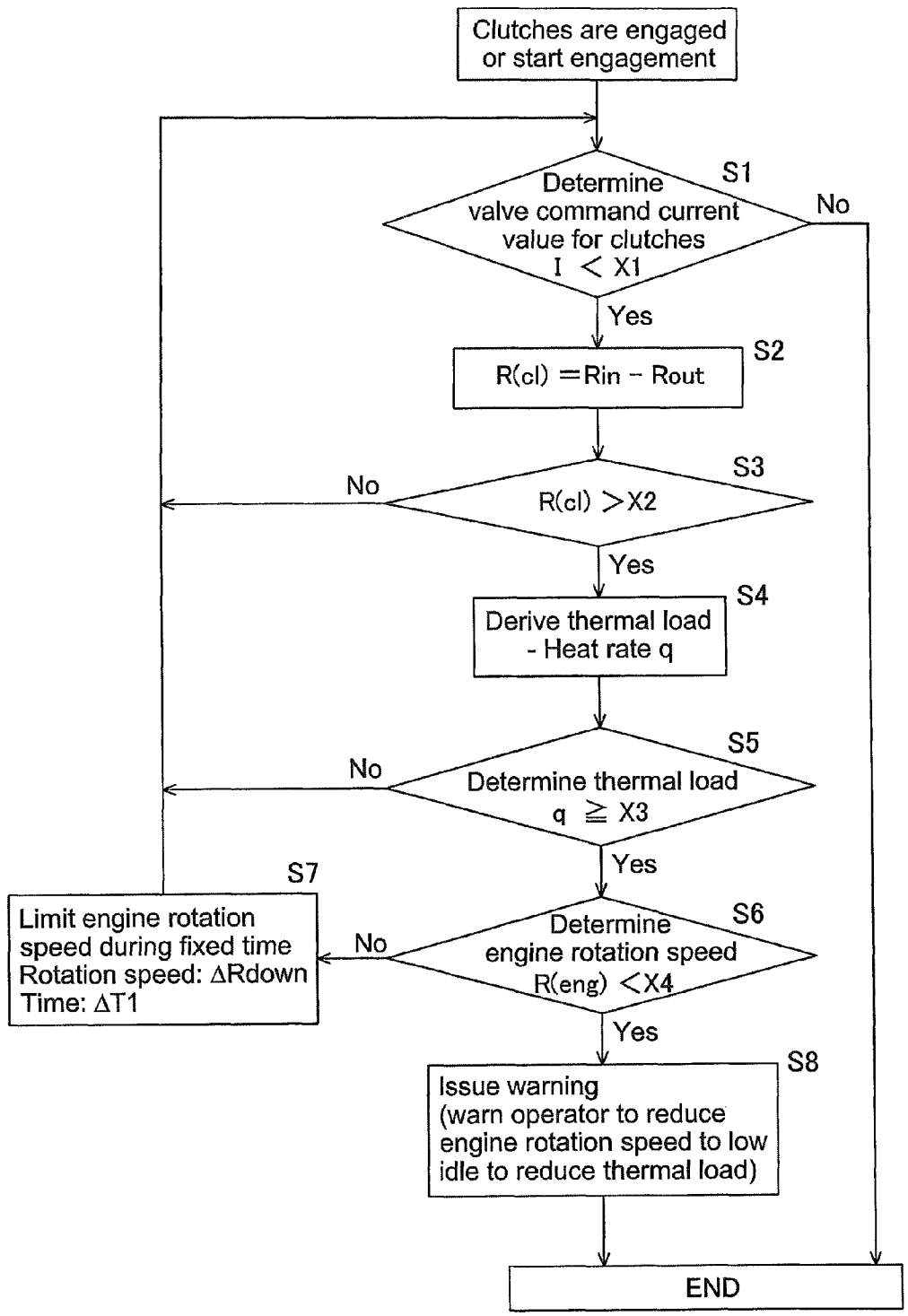
FIG. 3 is a flow chart of a protection process of the steering clutches.

An explanation of the protection process of the steering clutches 12L, 12R will be provided according to a flowchart in FIG. 3. While the following describes the protection process of the left steering clutch 12L, the protection process of the right steering clutch 12R is exactly the same.

First, in step S1, a determination is made as to whether the left steering clutch 12L (referred to simply as "steering clutch" below) is in the engaged condition from a hydraulic command value I (current value) to the left steering clutch 12L. Specifically, a determination is made as to whether the command current value I is less than a threshold X1. As described above, the steering clutches are negative type hydraulic clutches and thus are disengaged when a certain amount or more hydraulic pressure is supplied. Therefore, if the command current value I is less than the threshold X1, the steering clutch is determined to be engaged and the routine advances to step S2. If the command current value I is not less than the threshold X1, the steering clutch is determined to be in the disengaged condition and the protection process is not executed.

In step S2, the input/output rotation speed difference of the steering clutch is detected. Specifically, an input rotation speed Rin of the steering clutch is computed from a detection result by the rotation speed detecting sensor 31 of the output shaft of the transmission 17, and a detection result Rout of the rotation speed detecting sensor 32L at the output portion of the steering clutch is subtracted from the rotation speed Rin to obtain a rotation speed difference R(cl).

Next in step S3, a determination is made as to whether the rotation speed difference R(cl) obtained in step S2 is larger than a threshold X2. The threshold X2 may normally be set as "0 rpm", or may be set as a low rotation speed close to 0 rpm.

If the rotation speed difference R(cl) is larger than the threshold X2, the routine moves from step S3 to step S4. In step S4, a heat rate q that is a thermal load on the steering clutch is computed with the following equation (1).

$$q = \mu \times P \times R(cl) \ldots \quad (1)$$

μ: friction coefficient of the friction members that constitute the steering brake P: steering clutch pressure force at a certain time (computed from the hydraulic command value and the clutch disk surface area)

In step S5, a determination is made as to whether the heat rate q is equal to or greater than a threshold X3. The threshold X3 is a threshold preset from the durability of the plates that constitute the steering clutch and the friction members fixed to the plates.

If the heat rate q is greater than the threshold X3, the routine moves from step S5 to step S6. In step S6, a determination is made as to whether a current engine rotation speed R(eng) is lower than a threshold X4 with an engine rotation speed determining device 30d (FIG. 2.). The threshold X4 is the minimum accepted engine rotation speed in the vehicle and is preset.

If the engine rotation speed is equal to or greater than the threshold X4, the routine moves from step S6 to step S7 since there is a margin to further reduce the engine rotation speed from the current rotation speed. In step S7, the engine rotation speed is reduced by a certain time ($\Delta T$) and a certain rotation speed ($\Delta R$) to reduce the engine output. The routine then returns to step S1 and the above processing is repeated. As a result, a thermal load on the steering clutch is reduced.

Further, in step S6, if the engine rotation speed is equal to or less than the threshold X4, the routine moves from step S6 to step S8 since it is not desirable to reduce the engine rotation speed any further. A warning process is conducted in step S8. Specifically, in order to reduce the thermal load on the steering clutch, a display to warn the operator to lower the engine rotation speed to a low idle speed is displayed on an operating panel and the like.

Characteristics (1) The heat rate of the steering clutch caused by slippage is computed and the protection process is executed on the basis of the computing result. As a result, the steering clutches can be protected reliably and with higher accuracy in comparison to a case of executing the protection process by predicting various slippage modes as in the conventional device.

(2) Further, since the output of the engine is controlled in consideration of the heat rate of the steering clutch itself, defects such as unnecessarily reducing the engine output or not reducing the engine output when necessary can be prevented.

(3) When a determination is made as to whether the engine rotation speed is the preset accepted minimum rotation speed and the engine rotation speed is lower than the minimum rotation speed when reducing the engine rotation speed to control the output, a warning process is executed without reducing the engine output. As a result, the minimum level of vehicle performance can be maintained.

(Other Embodiments)

The present invention is not limited to the above embodiments and various changes and modifications may be made without departing from the spirit of the invention.

(a) While a process to reduce the thermal load by lowering the engine rotation speed and controlling the engine output when the thermal load on the steering clutch has become large in the previous embodiment, the protection process is not limited as such.

Figure 4:
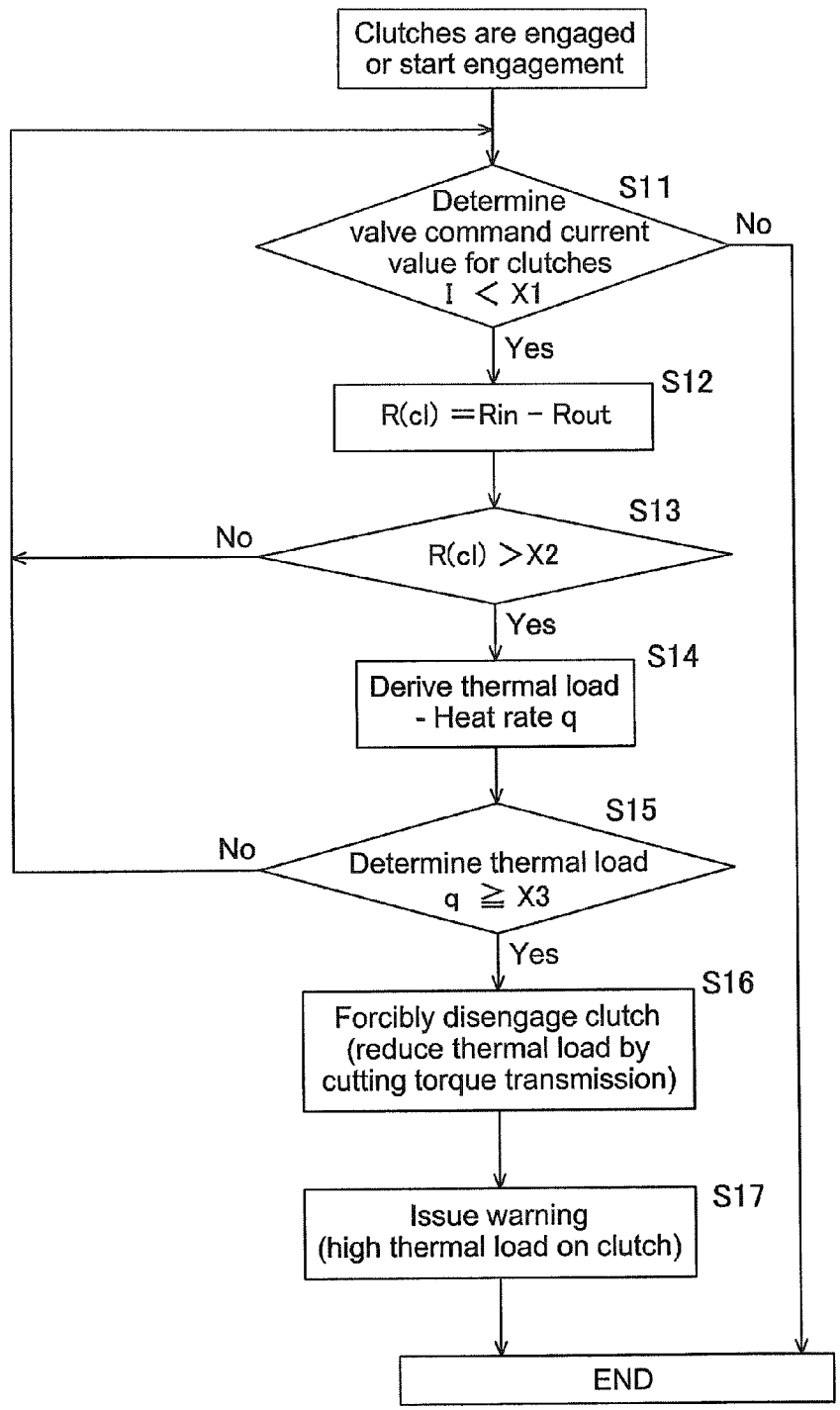
FIG. 4 is a flow chart of a protection process of the steering clutches according to another embodiment.

Disengaging the steering clutch with a high thermal load to lower the thermal load may be considered as another protection process. FIG. 4 is a flow chart of this case.

The processing of steps S11 to S15 in FIG. 4 is the same as the processing of steps S1 to S5 in the previous embodiment.

Specifically, when the steering clutch is found to be in the engaged condition when determining the engagement condition, the input/output rotation speed difference of the steering clutch is detected. If the rotation speed difference R(cl) is larger than the threshold X2, the heat rate q of the steering clutch is computed using Equation (1). If the heat rate q is equal to or greater than the threshold X3, the routine moves from step S15 to step S16. If the heat rate q is equal to or less than the threshold X3, the routine returns to step S11 and the processing of steps S11 to S15 are repeated.

In step S16, the steering clutch in which slippage occurs is forcibly disengaged. As a result, the thermal load can be reduced and the plates and friction members that constitute the steering clutch can be protected. The routine then advances to step S17 and a warning similar to the one of the previous embodiment is displayed on an operating panel and the like.

The steering clutch can be protected with high accuracy in this embodiment in the same way as in the previous embodiment.

Figure 5:
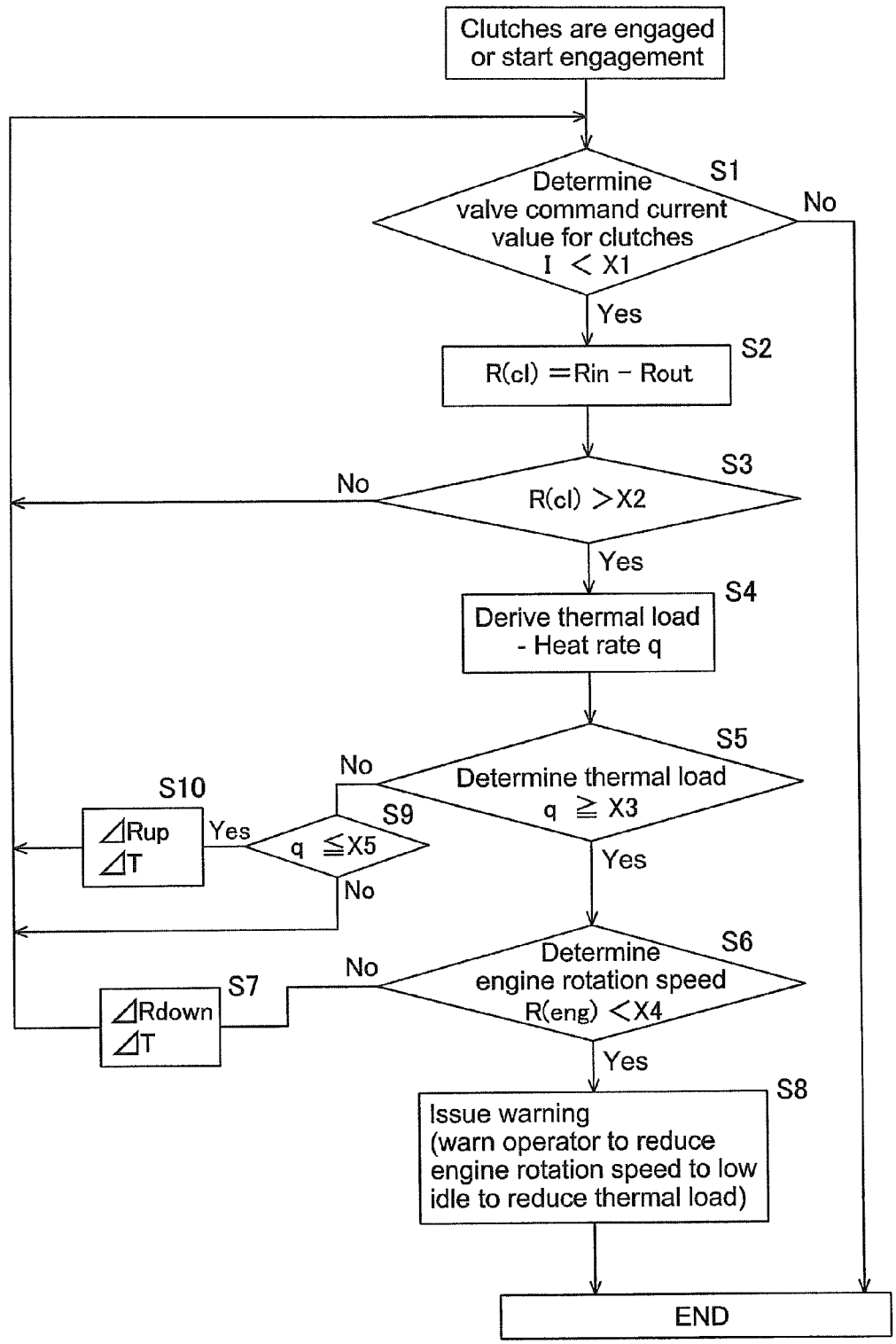
FIG. 5 is a flow chart of a protection process of the steering clutches according to another embodiment.

(b) While a process to reduce the engine output when the thermal load on the steering clutch has become large is described in the previous embodiment, raising the engine output when the thermal load is reduced may be conducted along with the process of the previous embodiment. FIG. 5 is a flow chart of this case.

The processing of steps S1 to S8 in FIG. 5 are the same as the processing of steps S1 to S8 in the previous embodiment. Here steps S9 and S10 are added.

Specifically, if the heat rate q of the steering clutch is lower than the threshold X3 in step S5, the routine moves to step S9. In step S9, a determination is made as to whether the heat rate q is equal to or less than a threshold X5. The threshold X5 is set as a value smaller than the threshold X3.

If the heat rate q is equal to or less than the threshold X5, the routine moves from step S9 to step S10 since it is determined that the thermal load is adequately small. In step S10, the engine output speed is increased by a certain time ($\Delta T$) and a certain rotation speed ($\Delta R$). The routine then returns to step S1 and the above processing is repeated.

The engine output can be reduced within a required minimum limit for the protection of the steering clutches. As a result, reduction of the turning performance due to the protection of the steering clutches can be suppressed.

(c) While the heat rate q of the steering clutches is computed to execute the protection process of the steering clutches in the previous embodiment, a total heat value Q of the steering clutches may be derived so that the protection process is executed according to whether the total heat value Q is equal to or greater than a certain threshold. In this case, "heat rate" may be replaced by "total heat value".

(d) While an example of a bulldozer has been described as the crawler work vehicle in the previous embodiment, the present invention may be another crawler type work vehicle and can be applied in the same way to a vehicle including steering clutches.

In the crawler work vehicle of the present invention, the occurrence of steering clutch slippage is reliably determined and the steering clutches can be protected with high accuracy. Further, a feeling of unease in the operator due to the heat rate of the steering clutch approaching a certain threshold can be suppressed and the steering clutches can be protected.

What is claimed is:

1. A crawler work vehicle comprising:
   an engine;
   left and right travel devices that respectively have a crawler and a drive wheel for driving the crawler;
   a power transmission device that transmits power of the engine to the drive wheels of the left and right travel devices;

left and right steering clutches that are disposed between the power transmission device and the left and right drive wheels, and that transmit or block power;

left and right steering brakes that are respectively disposed between the left and right steering clutches and the left and right drive wheels, and that brake rotation of the left and right drive wheels;

a rotation speed difference detecting device that detects a rotation speed difference between an input and an output of each of the steering clutches;

a clutch hydraulic pressure obtaining device that obtains a clutch hydraulic pressure supplied to the steering clutches; and a clutch protecting device that refers to the rotation speed difference and the clutch hydraulic pressure, that computes a steering clutch heat rate, and that compares the steering clutch heat rate that was computed with a preset first threshold to execute a steering clutch protection process.

2. The crawler work vehicle according to claim 1, wherein:
the clutch protecting device reduces the engine output upon determining the steering clutch heat rate is equal to or greater than the first threshold.

3. The crawler work vehicle according to claim 2, further comprising:
an engine rotation speed determining device that determines whether the engine rotation speed is a preset accepted minimum engine rotation speed;
the clutch protecting device executing a warning process without reducing the engine output while the engine rotation speed is lower than the minimum rotation speed upon determining the steering clutch heat rate is equal to or greater than the first threshold.

4. The crawler work vehicle according to claim 2, wherein the clutch protecting device increases the engine output by a certain amount upon determining the steering clutch heat rate is equal to or less than a second threshold that is smaller than the first threshold.

5. The crawler work vehicle according to claim 1, wherein the clutch protecting device disengages one of the left and right steering clutches while the steering clutch heat rate equal to or greater than the first threshold upon determining the steering clutch heat rate is equal to or greater than the first threshold.

6. The crawler work vehicle according to claim 5, wherein the clutch protecting device executes a warning process after disengaging the one of the left and right steering clutches upon determining the steering clutch heat rate is equal to or greater than the first threshold.

7. The crawler work vehicle according claim 1, wherein the power transmission device includes a torque converter that transmits power through operating fluid.

8. The crawler work vehicle according to claim 3, wherein the clutch protecting device increases the engine output by a certain amount upon determining the steering clutch heat rate is equal to or less than a second threshold that is smaller than the first threshold.

9. The crawler work vehicle according to claim 2, wherein the power transmission device includes a torque converter that transmits power through operating fluid.

10. The crawler work vehicle according to claim 3, wherein the power transmission device includes a torque converter that transmits power through operating fluid.

11. The crawler work vehicle according to claim 4, wherein the power transmission device includes a torque converter that transmits power through operating fluid.

12. The crawler work vehicle according to claim 5, wherein the power transmission device includes a torque converter that transmits power through operating fluid.

13. The crawler work vehicle according to claim 6, wherein the power transmission device includes a torque converter that transmits power through operating fluid.

* * * * *